United States Patent [19]

Harris

[11] 4,244,740

[45] Jan. 13, 1981

[54] PIPE COATING COMPOSITION UTILIZING CEMENT KILN DUST FILLER

[75] Inventor: Robert J. Harris, Marrero, La.

[73] Assignee: H. C. Price Co., Bartlesville, Okla.

[21] Appl. No.: 21,722

[22] Filed: Mar. 19, 1979

Related U.S. Application Data

[63] Continuation-in-part of Ser. No. 918,967, Jun. 26, 1978, abandoned.

[51] Int. Cl.³ .................................................. C09D 5/08
[52] U.S. Cl. .............................. 106/14.34; 106/281 R; 106/282
[58] Field of Search ................. 106/282, 281 R, 14.34

[56] References Cited

U.S. PATENT DOCUMENTS

| 3,078,324 | 2/1963 | Timothy | 106/282 |
| 3,526,525 | 9/1970 | Jersoy et al. | 427/184 |
| 4,018,617 | 4/1977 | Nicholson | 106/85 |
| 4,052,219 | 10/1977 | Marrs et al. | 106/281 R |

Primary Examiner—Lorenzo B. Hayes
Attorney, Agent, or Firm—Lowe, Kokjer, Kircher, Wharton & Bowman

[57] ABSTRACT

A pipe coating composition is the subject of the present invention. A bituminous base coating comprising binder, aggregate and fiber utilizes cement stack dust as a filler in place of conventional lime dust or cement. The cement stack dust filler is utilized in quantities up to 25% less than the quantity of lime dust previously required for lime dust.

5 Claims, No Drawings

PIPE COATING COMPOSITION UTILIZING CEMENT KILN DUST FILLER

This application is a continuation-in-part of application Ser. No. 918,967 entitled: COMPOSITION FOR COATING PIPE, filed June 26, 1978, now abandoned.

This invention relates to pipe coatings and, more particularly, to a coating composition employing a thermoplastic bituminous binder material.

It is well known in pipeline construction of the need for providing corrosion protection to pipe for marine or overland installations. In the case of marine installations or installations over swamp lands, it is necessary to coat the joints of pipe with a relatively heavy weight coating in addition to corrosion protection. Bituminous mastic materials have long been utilized in pipe coating because of their superior corrosion resistance and also because of their ability to form a binder for particulate material to provide an antibuoyancy coating.

A suitable bituminous mastic coating composition is disclosed in U.S. Pat. No. 3,526,525 issued Sept. 1, 1970 which is incorporated herein by reference.

Pipe coatings of the type described in the reference patent have normally employed as a filler material lime dust, portland cement or some combination. For example see U.S. Pat. No. 4,052,219 issued Oct. 4, 1977. The typical filler of the prior art have become more expensive to obtain over the years thus making a substitute product desirable. To my knowledge, however, no one has heretofore devised a suitable substitute for lime dust or portland cement in a bituminous mastic pipe coating composition.

It is, therefore, an object of the present invention to provide a pipe coating composition which employs a filler material other than lime dust or portland cement.

As a corollary to the above object, an important objective of the invention is to provide a coating composition for pipe having physical and chemical characteristics comparable with those of conventional coatings but at a lower cost.

Other objects of the invention will be made clear or become apparent from the following description and claims.

A conventional pipe coating composition employing a thermoplastic binder material will include from 5 to 15% by weight of the thermoplastic binder such as asphalt, 15 to 35% by weight of filler which has heretofore been lime dust, portland cement or some combination of the two, and a particulate material such as limestone or heavy ore bearing materials present in quantities ranging from 50 to 70% and with a fibrous material such as glass fibers present in a quantity of less than one percent by weight.

If the binder material is asphalt, it is heated to a temperature within a range of 350° F. to 400° F. and the dry components are then mixed with the heated binder so that the temperature of the final mix is 225° F. to 275° F. The material is normally applied using an extrusion process at a temperature of around 250° F. Other naturally occurring petroleum base binders known to those skilled in the art may be employed.

It has been found that, in lieu of lime dust or portland cement, a material which is obtained from the stacks of cement manufacturing plants may be substituted. The cement stack dust will normally comprise about 40%–50% lime with the remainder comprising inorganic minerals and salts. The cement stack dust material has been analyzed in accordance with ASTM test No. C-114 "Chemical Analysis of Hydraulic Cement."

Typical cement stack dust will vary over the ranges given in U.S. Pat. No. 4,018,617 issued Apr. 19, 1977, which patent is expressly incorporated herein by reference.

It is to be noted that in the analysis given in the referenced patent the combustion loss is 99% attributable to carbon dioxide from carbonate salts, largely calcium carbonate, with approximately 1% being attributable to water.

In general, cement stack dust may be used with a thermoplastic binder and particulate material to form a suitable coating composition. The binder material should comprise from 5% to 15% by weight, the cement stack dust filler should comprise from 15% to 35% by weight, and the particulate material which may include sand, crushed limestone, iron ore aggregate or a combination of these should comprise 50% to 70% by weight of the composition. It is to be understood that the term "particulate material" is intended to encompass fibrous substances. For example glass fibers may be utilized up to approximately 1% by weight of the total coating. The fibrous material is preferably about 0.2% by weight.

The components may be varied over a range of approximately + or −10% of the weight percentages given.

The preferred formulation is set forth below:

| PREFERRED COATING COMPOSITION FORMULATION | |
|---|---|
| COMPONENT | % by wt. |
| Type II Asphalt | 14.1 |
| Cement Stack Dust | 16.4 |
| Sand | 69.3 |
| Glass fiber | 0.2 |

The pipe coating composition set forth above has been subjected to various standard tests to determine tensile strength, flexural strength, modulus of elasticity, crack time and deflection co-efficient. It has been found that the formulation performs comparably with conventional formulations employing lime dust as the filler material.

It is believed that the substitution of cement stack dust as a filler material in a coating composition of the type set forth represents a substantial advance in the art and one offering unexpected results in terms of the performance of the final product. Substitution of materials of this type previously has not been attempted because of the various mineral impurities which are present in most potential substitute materials. In view of the fact that cement stack dust contains only about 50% lime, it was unexpected that this product would offer a suitable substitute for lime dust as a filler.

Having thus described the invention, I claim:

1. A pipe coating composition comprising a thermoplastic binder, particulate material and cement stack dust filler.

2. A composition as set forth in claim 1, wherein is included a fiber material.

3. A composition as set forth in claim 1, wherein said binder comprises asphalt and said particulate material comprises sand.

4. A composition as set forth in claim 1, comprising 5–15% by weight binder, 15–35% filler and 50–70% by weight particulate material.

5. A composition as set forth in claim 4, wherein said binder comprises Type II asphalt and said particulate material comprises up to one-half percent by weight glass fiber.

* * * * *